United States Patent [19]
Honold et al.

[11] 4,322,729
[45] Mar. 30, 1982

[54] INTERROGATOR-RESPONSOR SYSTEM FOR SECONDARY RADAR DEVICES

[75] Inventors: Peter Honold, Munich; Gerhard Wagner, Schaftlach, both of Fed. Rep. of Germany

[73] Assignee: Siemens Aktiengesellschaft, Berlin & Munich, Fed. Rep. of Germany

[21] Appl. No.: 95,887

[22] Filed: Dec. 7, 1970

[30] Foreign Application Priority Data

Dec. 10, 1969 [DE] Fed. Rep. of Germany ....... 1961914

[51] Int. Cl.³ .............................................. G01S 13/78
[52] U.S. Cl. .................................................. 343/6.5 R
[58] Field of Search ....................... 343/6.5 R, 6.5 LC

[56] References Cited

U.S. PATENT DOCUMENTS 3,181,143  4/1965  Villiers ......................... 343/6.5 R X
3,905,035  9/1975  Krumboltz et al. ............. 343/6.5 R Primary Examiner—T. H. Tubbesing
Attorney, Agent, or Firm—Hill, Van Santen, Steadman, Chiara & Simpson

[57] ABSTRACT

A method of accurate friend-foe recognition on the basis of secondary radar through the provision additional special information in both the interrogation device and the responsor device during the formation of their respective signals. This additional information is solely practical and valid for the respective responsor device undergoing interrogation so that the answering signals provided are valued as answers coming from a friend-responsor device. Additional steps of utilizing the time position of the additional information and the uniqueness of such information with respect to a simultaneously available great number of responses makes it still more difficult for a foe-responsor to pass itself off as a counterfeit friend-responsor.

15 Claims, 1 Drawing Figure

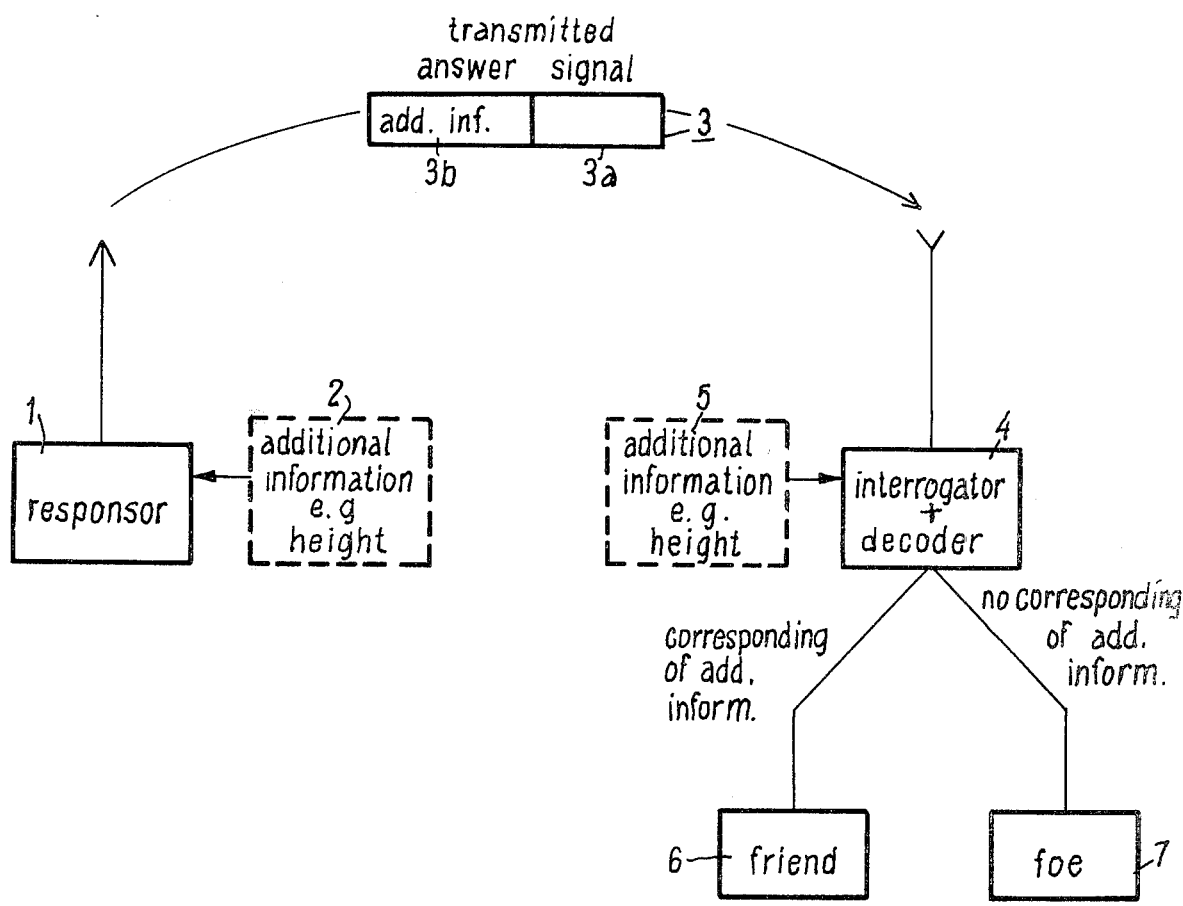

INTERROGATOR-RESPONSOR SYSTEM FOR SECONDARY RADAR DEVICES

BACKGROUND OF THE INVENTION

This invention relates to an interrogator-responsor system for secondary radar devices with friend-foe recognition in which the answering signals which are received in response to an interrogation are investigated as to whether they are coded in a definite manner and are different from the expected coding of signals, such as signals which are being identified as coming from foe-responsor devices.

In coded friend-foe recognition on the basis of secondary radar it is the primary purpose to prevent a hostile object from presenting itself as a friendly object. By impulse controlled code changes and other safety measures a foe has no opportunity to produce for its own use codes correctly timed with sufficient probability. For simulating a friend recognition, a foe is required to listen constantly to the answers of friends in order to possess the true recognition existing at any moment. If an enemy object has the possibility of receiving, briefly storing and transmitting responses upon inquiry, as long as the same responses are valid, then a genuine "friend" cannot be distinguished from a "counterfeit" friend, when the hostile object is reached by the respective response later than a friendly object which is in the neighborhood and has the benefit of the previous interrogations and therefore permits a repetition of the valid response for a sure deception. In order to distinguish a "genuine" friend from a "counterfeit" friend in spite of the foregoing, and in order to exclude other disturbing possibilities, the present invention proposes particular steps.

SUMMARY OF THE INVENTION

As pointed out above, the invention relates to an interrogator-responsor system for secondary radar devices with friend-foe recognition in which the answering signals which are received upon an interrogation are investigated as to whether they are coded in a definite manner and are different from the expected coding of signals, such as signals which are being identified as coming from foe-responsor devices aboard enemy objects. The invention solves the problem of distinguishing genuine and counterfit responses in such a manner that in the interrogation device, as well as in the responsor device, known information in the responsor device is added during the formation of the signals for responding to the same. This additional information has a very special individual content which is uniquely practical and valid for the respective responsor device. Only the answering signals provided with this additional information are valued as answers coming from a friend-responsor device.

A further solution of the above mentioned problem consists in the following: that already at the transmission of the interrogation signals the latter has added thereto additional information which is in a form having a content only applicable to a predetermined responsor device; and that only the predetermined responsor device transmits a signal which recognizes the additional information as being unique to that device; and that only the answering signals provided with the additional information will be valued as answers of a friend-responsor device. The foregoing procedure, in addition, is very suitable to deprive the foe of the possibility to employ received and valid recognized interrogations for the purpose of "luring" responses given by friends. The foe will lose the opportunity to exploit the responsor devices for a comprehensive "foe recognition", because the overheard interrogation effects a response at the most to one object with the short-time valued interrogation which contains the additional information.

DESCRIPTION OF THE PREFERRED EMBODIMENTS

The foregoing has set forth that the invention is concerned with the provision of unique additional information identifiable only with a friend-responsor device for accurate friend-foe recognition. As independent additional information may be used, not only navigation data, as for example, direction of movement, speed and position coordinates, but also information obtained in separate, safe ways (such as integrated systems, data and voice channel transmission). Within the frame of a voice or data channel transmission additional information may be inserted from which the foe is unable to learn that the same are at all connected with the interrogator-responsor system and the foe will not at all recognize the special information portions which have been employed. In addition, it is possible to determine systematically that definite additional information is to become valid only after a predetermined period of time, so that the additional information will be even more difficult to obtain by a foe. The additional information should have for each object the most possible individual character. The possibility that a number of objects will have the same additional information then becomes very small. It is advantageous when as many data are available as possible and that these be used because then the probability that two objects have, for instance, the same speed and the same direction of flight and the same flight elevation (within the accuracy of measurement) is very small. Navigational data may be determined on board of the interrogated object with different auxiliary means (for instance with on board radar, doppler sensors). The interrogator stations may suitably obtain the data with the assistance of special primary radar measurements or by means of special data channels, all of which information producing means and techniques are well known in the art.

When the interrogator station determines that the data obtained for an object by its own instruments agree with the measurements which are taken from the received identifications, then it is assured that the interrogated object is a friend.

It is important that a foe does not obtain an opportunity to separate the additional individual code from the specific identification determined by the signal controlled code; he could then, with the knowledge of the system, change the responses in such a manner that the individual additional, for instance, corresponds to his own genuine navigation data. For this reason, it is proposed to prepare simultaneously a great number of responses. From the great number of available responses, the additional information is then selected as a definite answer from the just valid ones. One may also proceed in such a manner that a definite code is only valid for a definite period of time, which in a "mixer" influenced by the additional information cannot be unambiguously or clearly reversed by a foe.

A reversing of this system is then obtained when the measured primary radar data, measured by the interrogating stations, include the interrogation code. Then only the transponder of objects answer whose constantly self-determined navigation data (for instance, speed and direction) agree with sufficient accuracy with the values in the interrogation. This "reversed" method has the possibility that a plurality of objects, which are all moving in the same direction, with respect to the interrogating antenna, request only definite objects to respond whereby a defruiting effect is obtained and the "foe recognition" toward the foe is avoided.

In order that inevitable measuring errors occurring during the determination of the additional data and the forced resulting digital errors do not have adverse effect in the system, it is necessary to introduce for data comparison a relatively wide tolerance range (reception gate). Since the determination of the individual information may be afflicted with measuring errors, the "reception gate" has to be so "wide" that calculable standard deviations do not produce a foe signal in the friendly system device.

Referring to the drawing, an answer device or responsor 1 is provided with the additional information contained in a storage device 2. This information may be, for example, the height of an airplane above the ground which is detected by an altimeter in the airplane in a manner which is well known in the art. The radiated answer signal 3 contains the common coding in a part 3a and in a part 3b the additional information is provided. The answer signal reaches the receiving antenna of the interrogation device 4 where the additional information about the respective responsor is contained in a storage device 5. Therefore, the altitude, for example, of the interrogated airplane can be ascertained by a primary radar device insofar as devices for altitude recording are present in the latter. The additional information 3b in the answer signal is now compared with the information contained in the storage device 5 and, when both informations coincide, one is concerned with a "friend" answer which is indicated in the device 6. However, if the information does not coincide, an opponent has attempted to imitate an answer signal and an "enemy" indication is effected in the device 7.

The method of this invention is principally intended to be advantageously utilized in airplane recognition or ship recognition, and while we have disclosed the invention by reference to specific illustrative embodiments, many changes and modifications thereof may be made by those skilled in the art without departing from the spirit and scope of the invention, and it is intended that the patent warranted hereon cover all such changes and modifications as may reasonably and properly be included within the scope of out contribution to the art.

What we claim is:

1. The method for friend-foe recognition in an interrogator-responsor system for secondary radar devices in which the answering signals which arrive upon interrogation are investigated as to whether they have been coded in a definite manner and deviating from the expected coding are identified as signals coming from a foe-responsor device, comprising the steps of forming information having unique individual content having value only for a respective responsor device; providing the information to the interrogator device; forming an answering signal and transmitting same from the responsor device; adding the information to the answering signal; and comparing in the interrogator device the information with the corresponding information portion of the answering signals whereby corresponding information is indicative of a friend-responsor device.

2. The method according to claim 1 comprising the step of deriving at least a part of the additional information from navigation data of the responsor device.

3. The method according to claim 1 comprising the step of deriving the additional information from the speed, direction of movement and elevation of the responsor device.

4. The method according to claim 1 comprising the transmission of the additional information over a separate channel to the interrogator device.

5. The method according to claim 1 wherein the additional information is inserted in the answering signals at a predetermined time and the step of comparing comprises the step of comparing the information at said predetermined time after its appearance at the interrogator device.

6. The method according to claim 1 comprising deriving the additional information by means of a primary radar device.

7. The method according to claim 1 comprising the derivation of the additional information by self-measuring techniques.

8. The method according to claim 1 wherein the additional information is provided with substantially the same accuracy to the interrogator device and to the responsor device and comprising the step of reception gating in accordance with the accuracy tolerances.

9. The method according to claim 1 comprising the preparation of a number of answers in the responsor device from which answers a specific one is selected in relation to the additional information.

10. A method for friend-foe recognition in an interrogator-responsor system for secondary radar devices which the answering signals which arrive upon interrogation are investigation as to whether they have been coded in a definite manner and deviating from the expected coding are identified as signals coming from a foe-responsor device, comprising the steps of: providing a responsor device with information unique to that device; providing the same unique information to an interrogator device; transmitting an interrogation signal including the unique information to the responsor device; in the responsor device comprising the unique information with that transmitted thereto; and transmitting an acknowledgment signal from the responsor device to indicate that the unique added information is correct to identify from the unique information a friend-responsor device.

11. The method according to claim 10 comprising the step of deriving at least a part of the unique information from navigation data of the responsor device.

12. The method according to claim 10 comprising the step of transmitting the unique information over a separate channel to the responsor device.

13. The method of claim 10 wherein the unique information is inserted in the transmission from the interrogator device at a predetermined time and the step of comparing is further defined as comparing the unique information at said predetermined time after its appearance at the respondor device.

14. The method according to claim 10 comprising deriving the unique information by means of a primary radar device.

15. The method according to claim 10 wherein the unique information is provided with substantially the same accuracy to the interrogator device and to the responsor device and comprising the step of reception gating in accordance with the accuracy tolerances.

* * * * *